United States Patent [19]

Hemmen

[11] 4,146,159
[45] Mar. 27, 1979

[54] SLIDABLE AUTOMOBILE STORAGE ARM REST

[76] Inventor: Alan J. Hemmen, 12520 SW. 124th, Tigard, Oreg. 97223

[21] Appl. No.: 857,519

[22] Filed: Dec. 5, 1977

[51] Int. Cl.² .............................................. B60R 7/00
[52] U.S. Cl. ................................... 224/275; 297/194
[58] Field of Search ............... 224/29 D, 29 R, 29 K, 224/29 H, 42.42 A, 42.42 R, 42.43, 42.21; 297/194, 188, 113, 414; 312/235 A; 296/24 R, 37.8; 108/137, 44; 206/477; 248/346

[56] References Cited

U.S. PATENT DOCUMENTS

| 2,678,682 | 5/1954 | Thomas | 224/42.42 A |
|---|---|---|---|
| 2,692,069 | 10/1954 | Winters et al. | 224/29 D |
| 2,797,739 | 7/1957 | Orsini | 297/194 |
| 3,304,143 | 2/1967 | Connell | 297/194 |
| 3,338,629 | 8/1967 | Drees | 297/194 |

FOREIGN PATENT DOCUMENTS 940114  1/1947  France ................................. 297/194

Primary Examiner—Trygve M. Blix
Assistant Examiner—Kenneth W. Noland
Attorney, Agent, or Firm—W. Britton Moore

[57] ABSTRACT

A storage arm rest contoured to fit the front seat of a two door vehicle and slidably arranged on a tray base fixedly positioned thereon to permit of forward sliding adjustment of the arm rest and free tilting of the seat back prior to opening of and passage through the vehicle doors.

5 Claims, 7 Drawing Figures

SLIDABLE AUTOMOBILE STORAGE ARM REST

This invention relates to a storage arm rest for the front seat of a two door vehicle and slidably arranged on a tray base thereon to permit forward adjustment of the arm rest and free tilting of the seat back prior to the opening of and passage through the vehicle doors.

It has been customary to arrange various types of storage containers on the front seats of vehicles, such as those shown in U.S. Pat. Nos. to Krone 3,104,131, Dress 3,338,629, Sturgeon 3,922,973, and Hawie 3,951,448, but when used in a coupe or two door vehicle having a tiltable back for the front seat, the storage containers obstructed free tilting movement thereof resulting in damage to the containers and/or seat backs, as well as hampering passage through the doors.

The principal object of the present invention is to provide a combined arm rest and storage container for the front seat of a two door vehicle and slidably arranged on a tray base fixedly positioned thereon to permit of forward sliding adjustment of the arm rest and free tilting of the seat back prior to opening of and passage through the vehicle doors.

Another object is the provision of a combined arm rest and storage container slidably arranged on a flat tray base fixedly attached to the seat of a vehicle having a tiltable seat back and wherein the container is movable forwardly to permit of free tilting of the seat back.

Still another object is the provision of a combined arm rest storage container having a slotted flat bottom slidably interfitting a track on a tray base fixedly strapped to a seat of a vehicle having a tiltable seat back and wherein the container is movable forwardly relative to the tray base to permit of free tilting of the seat back.

A further object is to provide a generally rectangular combined arm rest and storage container contoured to fit on a vehicle seat having a tiltable seat back and so slidably arranged on a flat base fixedly positioned on the seat that the container will slide forwardly on its base as the seat back is tilted to permit passage through the doors.

Still a further object is to provide an attractive and inexpensively produced combined arm rest and storage container which is tapered to accommodate the usual sloping vehicle seat and will provide a flat generally horizontal top arm rest surface.

These and other objects and advantages will be apparent as the specification is considered with the accompanying drawings, wherein FIG. 1 is a perspective view of a vehicle seat having a tiltable seat back in upright position, and wherein the back rest and storage container is positioned adjacent to lower portion of the seat back;

Figure 1:
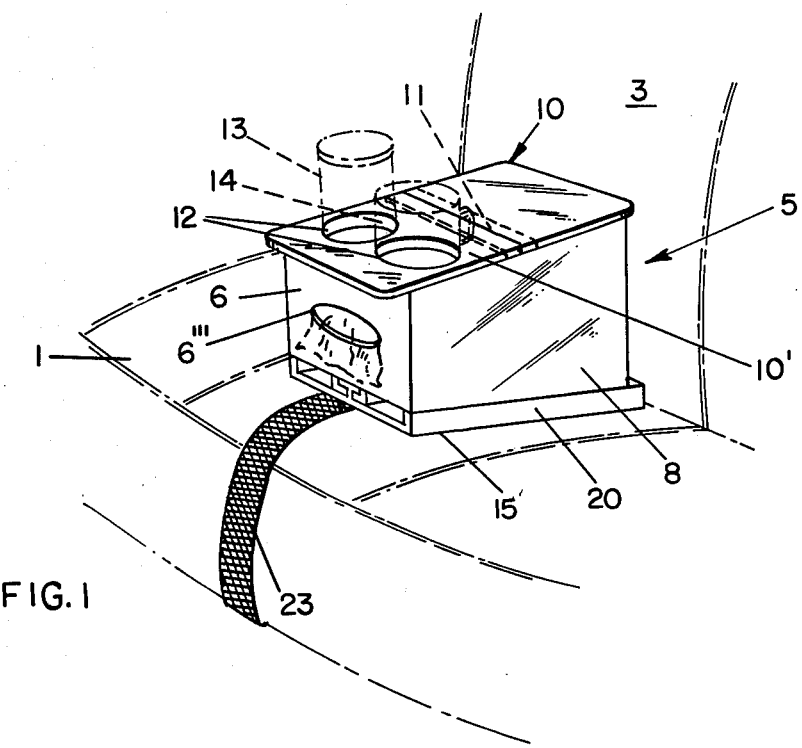

Referring more particularly to the drawings, wherein similar reference characters designate like parts throughout the several views, a front seat 1 of a two door sedan type automobile 2 having a forwardly tilting seat back 3, which is customarily tilted to facilitate passage through one of two side vehicle doors 4, only one being shown, to gain access to a rear seat, also not shown.

Figure 2:
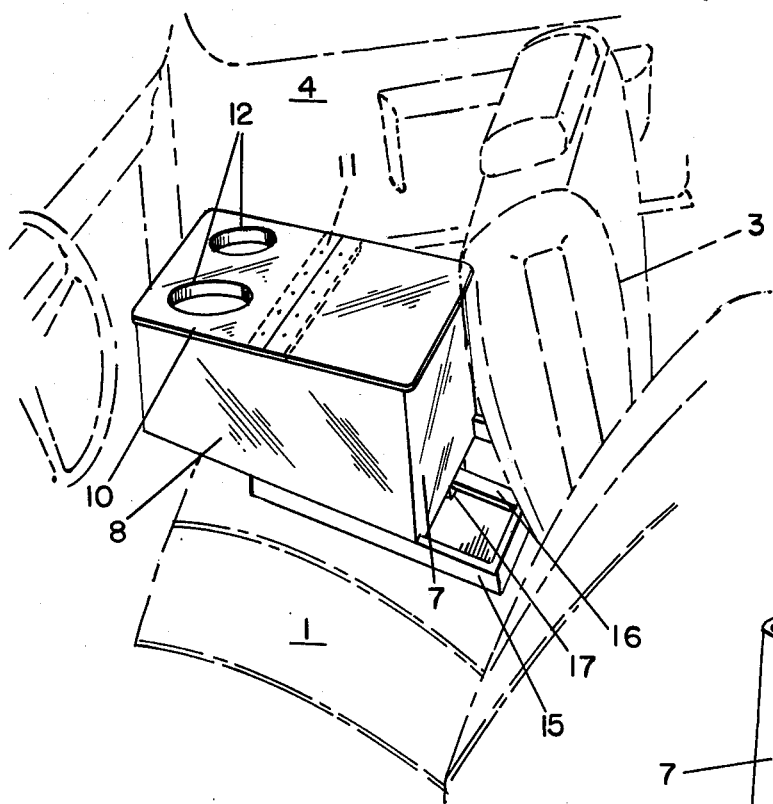
FIG. 2 is a perspective view showing the forward position of the container when engaged by and pushed forwardly during tilting of the seat back.
Figure 3:
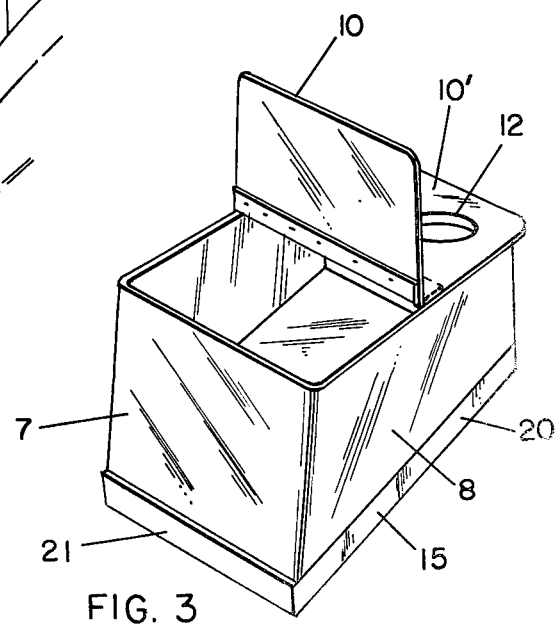
FIG. 3 is a perspective view of the combined arm rest and storage chamber arranged on its flat tray base.

A generally rectangular combination arm rest and storage container 5 has flat front 6, rear 7, sides 8, and bottom walls 9, with the upper end being open and closed by a two-part flat cover 10, hinged at its midsection, as at 11, to the upper rim of the side walls 8. As vehicle seats usually slope from front to back, it is important that the flat cover 10 be horizontally disposed to levely support articles therein and thereon to minimize spillage and to provide a comfortable support for an arm of the driver or passenger. Thus, the front wall 6 is shorter than rear wall 7, and the side walls 8 taper forwardly so that the container will be contoured to the shape of the seat, as best shown in FIGS. 1 and 2. The front section 10' of the cover is formed with two circular wells 12 for receiving and vertically securely supporting containers or cups 13 for liquids, and, if desired, one of these wells may be enlarged to accommodate a larger drinking vessel, e.g., a coffee mug 14. In addition, a vertical interior partition wall 6' may be spaced inwardly of and parallel to front wall 6 to provide a tissue box compartment 6" at the front of the container. Access to this compartment may be had through a circular opening 6''' in the front wall to permit of tissues being extracted therethrough as shown in FIG. 1.

Figure 4:
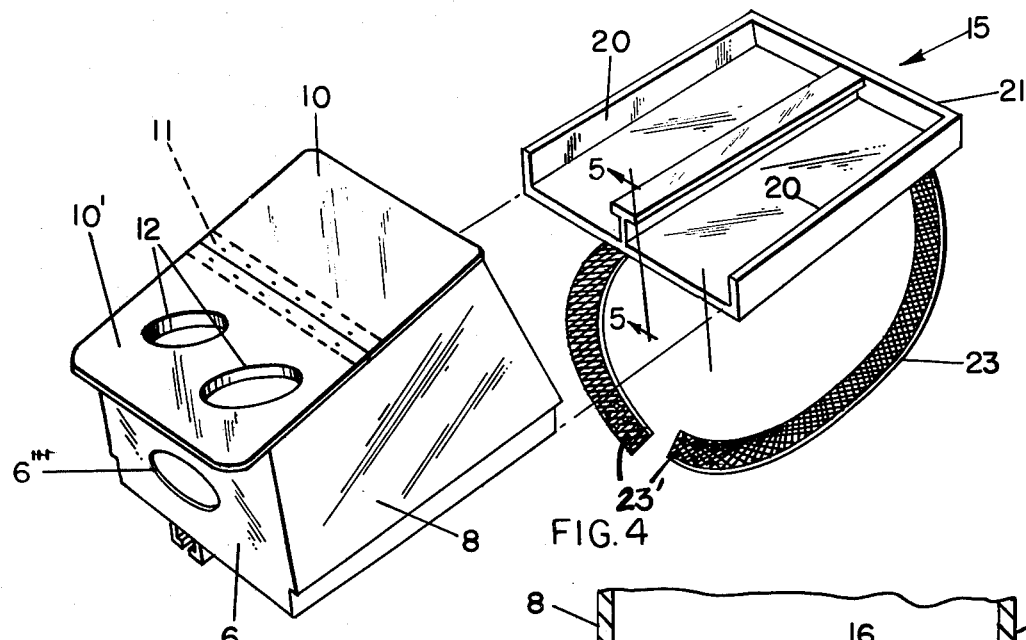
FIG. 4 is an exploded view of the storage container and tray base showing the seat attaching strap for the latter.
Figure 6:
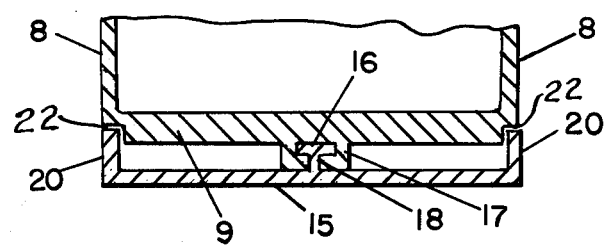
FIG. 6 is a section through the assembled storage container and tray base showing the interfitted track and slot thereof.
Figure 5:
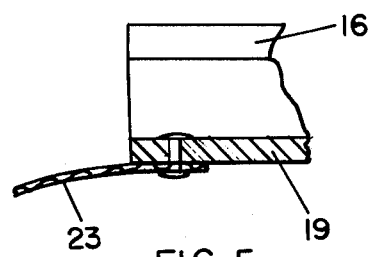
FIG. 5 is a section on the line 5—5 of FIG. 4 to show a connection for the tray attaching strap.
Figure 7:
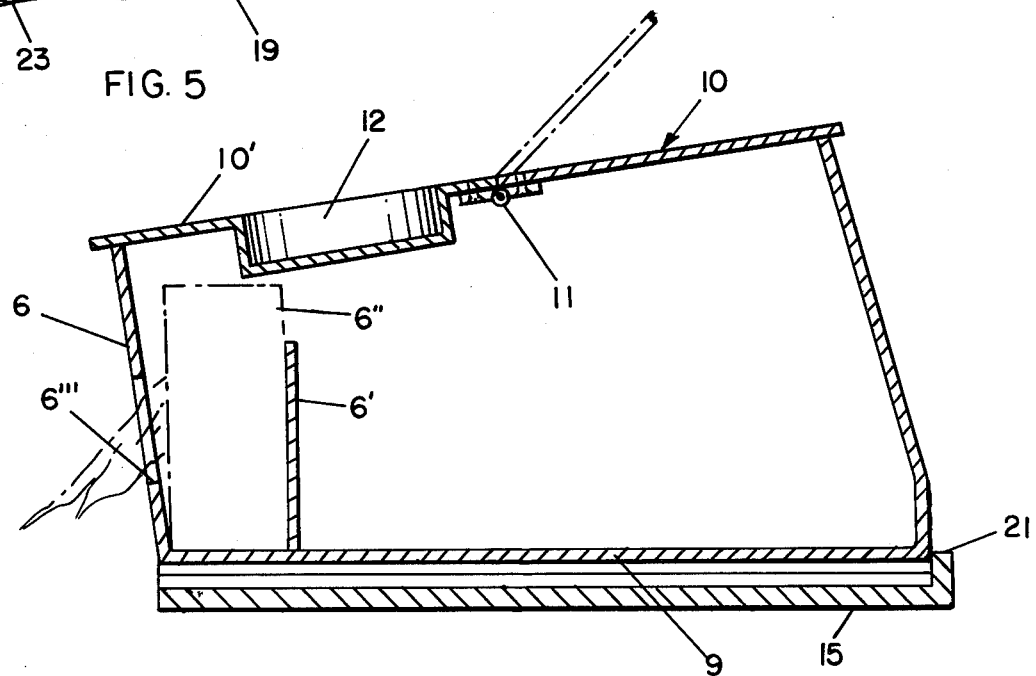
FIG. 7 is a longitudinal section through the assembled storage container and tray base showing the hinged top thereof.

As best shown in FIGS. 4 and 6, the bottom wall 9 rests upon and is supported by a flat tray base 15, of the same material, and centrally formed with a longitudinally extending, upstanding, T-shaped tongue 16 interfitting an elongated, centrally arranged, U-shaped channel 17, formed on and depending from the bottom wall and having a longitudinal slot 18. Tray 15 is open at its front, as at 19, but is provided with upturned side flanges 20 and rear flange 21. The flat bottom wall 9 is longitudinally recessed at each side from front to rear, as at 22, to receive and rest upon side tray edges 20. Tray 15 is flatly and centrally positioned upon the upper surface of front seat 1, toward the rear thereof adjacent seat back 3, and is preferably anchored or secured thereto by flat flexible strap members 23, suitably attached to the front and rear edges of the tray (FIG. 5). The free ends of the straps may be joined by tying together through a series of eyelets 23' (FIG. 4) underneath the seat, whereby the position of the container is stabilized and theft of the container is deterred.

With the arm rest and storage container arranged on and secured to the front seat 1, as shown in FIG. 1, forward tilting of the seat back 3 presses against and causes the container to slide forwardly on and relative to tongue 16 of tray base 15 to a position approximately that of FIG. 2. This movement permits free tilting of the seat back and enables occupants of the vehicle to pass with relative ease through the side doors while entering and exiting the rear seat. When the seat back is returned to its normal upright FIG. 1 position and the vehicle doors closed, the combined arm rest and storage container may be readily slidably moved to its FIG. 1 at rest position by exerting a manual rearward pull thereon, in an obvious manner.

While a preferred embodiment has been shown and described, it is to be understood that various changes and improvements may be made therein, without departing from the scope and spirit of the appended claims.

What I claim is:

1. A combined arm rest and storage container for two-door sedan type vehicles having front and rear seats with said front seat being upwardly and forwardly inclined and a tiltable seat back for the front seat comprising a generally rectangular container having flat side, front, rear, and bottom walls, and a flat cover, said front wall being shorter than said rear wall, and said side walls being tapered forwardly whereby said container is contoured to said seat and presents a generally horizontal flat supporting cover surface, longitudinal slotted channel means on said bottom wall, a flat tray base arranged on said seat, said flat bottom container wall being recessed at its side edges, and said tray base having upstanding side flanges for interfitting said side recesses, elongated tongue means on said base interfitting said channel means whereby said container will be engaged by said seat back and slidably moved forwardly on and relative to said tray base as said seat back is tilted forwardly to permit of opening of said vehicle doors for entering and exiting the rear seat.

2. A combined arm rest and storage container, according to claim 1, wherein said tray base is open at its front and has an upstanding rear flange engageable with the rear wall of said container.

3. A combined arm rest and storage container, according to claim 1, wherein said channel means is formed on and depends from the bottom wall in the midsection thereof.

4. A combined arm rest and storage container, according to claim 3, wherein said channel means is generally U-shaped, and said tongue means is generally T-shaped.

5. A combined arm rest and storage container, according to claim 1, wherein said cover is two-part and hinged in its midsection, beverage container wells are formed in the front section of said cover, and said container has a partition wall spaced rearwardly of said front wall to provide a tissue compartment, and an opening in said front wall through which tissues may be extracted.

* * * * *